United States Patent
Miura et al.

(10) Patent No.: US 7,169,287 B2
(45) Date of Patent: *Jan. 30, 2007

(54) DECOMPOSITION APPARATUS AND DECOMPOSITION METHOD

(75) Inventors: Toshihiko Miura, Kiyose (JP); Hiroshi Kubo, Tokorozawa (JP); Kinya Kato, Kanagawa (JP); Masahiro Kawaguchi, Kanagawa (JP); Akira Kuriyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

This patent is subject to a terminal disclaimer.

(21) Appl. No.: 10/206,697

(22) Filed: Jul. 26, 2002

(65) Prior Publication Data

US 2003/0019743 A1   Jan. 30, 2003

(30) Foreign Application Priority Data

Jul. 27, 2001   (JP)   ............................... 2001-227674

(51) Int. Cl.
*C02F 1/461*   (2006.01)
(52) U.S. Cl. .................. 205/688; 205/742; 204/288.6; 204/275.1; 588/303
(58) Field of Classification Search ................ 205/688, 205/742; 204/228.6, 275.1; 588/204, 303
See application file for complete search history.

(56) References Cited

U.S. PATENT DOCUMENTS

| | | | | |
|---|---|---|---|---|
| 3,305,472 A | * | 2/1967 | Oldershaw et al. | ......... 204/268 |
| 5,362,367 A | * | 11/1994 | Dapperheld et al. | ........ 205/440 |
| 5,419,816 A | * | 5/1995 | Sampson et al. | ........... 205/556 |
| 5,569,809 A | * | 10/1996 | Gui | ............................. 588/303 |
| 5,980,727 A | * | 11/1999 | Putz et al. | ................... 205/688 |
| 6,383,362 B2 | * | 5/2002 | Satoh | ......................... 205/688 |
| 6,444,015 B2 | | 9/2002 | Kato | ............................ 95/143 |
| 6,462,250 B1 | | 10/2002 | Kuriyama et al. | .......... 588/204 |
| 6,585,897 B2 | | 7/2003 | Kato | ........................... 210/756 |
| 2003/0019742 A1 | | 1/2003 | Miura et al. | ............. 204/275.1 |

* cited by examiner

*Primary Examiner*—Arun S. Phasge
(74) *Attorney, Agent, or Firm*—Fitzpatrick, Cella, Harper & Scinto

(57) ABSTRACT

A decomposition apparatus that decomposes a decomposition target is provided. The decomposition apparatus includes a decomposition chamber having a decomposition section that continuously decomposes the decomposition target, an introducing device that continuously introduces the decomposition target into the decomposition chamber, a discharging device that discharges decomposition products produced in the decomposition chamber, and a selection section that selects a set of drive conditions from a plurality of sets of conditions for the decomposition section such that the concentration of the decomposition target within the decomposition chamber during decomposition of the decomposition target is at the predetermined concentration. When the concentration of the decomposition target is the predetermined concentration during decomposition in the decomposition section under the set of drive conditions selected by the selection section, the amount per unit time of the decomposition target that is taken into the liquid within the decomposition chamber is in equilibrium with the amount per unit time of the decomposition target that is decomposed within the decomposition chamber.

15 Claims, 4 Drawing Sheets

DECOMPOSITION APPARATUS AND DECOMPOSITION METHOD

BACKGROUND OF THE INVENTION

1. Field of the Invention

The present invention relates to a decomposition apparatus and a decomposition method suitable for the decomposition/removal of hazardous materials (contaminants) such as organic chlorinated compounds in a gaseous or mist state, and to a decomposition apparatus and a decomposition method for substances.

2. Related Background Art

Organic chlorinated compounds used to clean machinery are often found to be contaminating the soil of vacant lots where factories or dry cleaning establishments used to stand. Such organic chlorinated compounds are chemically stable, and this has drawn attention to cleaning the contaminated soil in recent years.

Some of the methods for decomposing/removing organic chlorinated compounds include incineration, thermal decomposition, photolysis, oxidative decomposition, reductive decomposition, using catalysts, and microbial decomposition. Besides these, electrolysis has been developed as a decomposition/removal method. The electrolysis method is a technology in which contaminated water containing organic chlorinated compounds is energized to alter electrode surfaces to an oxidative or reductive state, which decomposes the contaminants through oxidation-reduction reaction and makes them harmless.

However, in such a conventional electrolysis method, electrodes cannot be inserted into organic chlorinated compounds in a gaseous or mist state extracted from contaminated soil to be energized. There is a method to absorb organic chlorinated compounds in a gaseous or mist state into a liquid phase and energize the liquid phase to electrolytically process it, but this requires a separate processing for the liquid phase after the organic chlorinated compounds are absorbed.

It is known that as the concentration of contaminants increases, so does the electric decomposition efficiency per unit electrical charge. However, when the liquid phase that has absorbed an organic chlorinated compound is electrolyzed, the concentration falls as the decomposition process continues, so that the decomposition efficiency per unit time declines.

SUMMARY OF THE INVENTION

The present invention solves the above problem and provides a decomposition apparatus and a decomposition method for hazardous materials, as well as a decomposition apparatus and a decomposition method for substances, that do not require a separate processing of a liquid phase that has absorbed hazardous materials such as organic chlorinated compounds, and that can maintain high decomposition efficiency.

A decomposition apparatus in accordance with an embodiment of the present invention decomposes a decomposition target, and includes a decomposition chamber having a decomposition section that continuously decomposes the decomposition target, an introducing device that continuously introduces the decomposition target into the decomposition chamber, a discharging device that discharges decomposition products produced in the decomposition chamber, and a selection section that selects a set of drive conditions from a plurality of sets of conditions for the decomposition section such that the concentration of the decomposition target within the decomposition chamber during decomposition of the decomposition target would be at a predetermined concentration level, wherein, when the decomposition target is at the predetermined concentration level during decomposition in the decomposition section under the set of drive conditions selected by the selection section, the amount per unit time of the decomposition target that is taken into the liquid within the decomposition chamber is in equilibrium with the amount per unit time of the decomposition target that is decomposed within the decomposition chamber.

The decomposition chamber may also have a device that brings a gas containing the decomposition target that is introduced into the decomposition chamber into contact with a liquid that is input into the decomposition chamber.

The decomposition section may begin the decomposition of the decomposition target after the concentration of the decomposition target within the decomposition chamber has increased to the predetermined concentration level.

The decomposition section may begin the decomposition of the decomposition target after the concentration of the decomposition target has increased to a concentration level higher than the predetermined concentration level.

The decomposition section may be equipped with electrodes to perform electrolysis.

The drive condition may be a current value to perform the electrolysis.

The liquid may be an electrolytic solution.

The electrolytic solution may contain an additive with affinity to nonpolar substances.

The concentration of the decomposition target may be about 0.5–50%.

The decomposition target may be an organic chlorinated compound.

The organic chlorinated compound may be at least one of monochloroacetic acid, dichloroacetic acid and trichloroacetic acid.

The liquid may contain chloride ions.

The liquid may be a sodium chloride solution.

The liquid may be acidic.

The liquid's pH may be between about 0.5 and 3.

A decomposition method in accordance with an embodiment of the present invention pertains to a method to decompose a decomposition target in a liquid within a decomposition chamber and comprises a selection step of selecting a set of decomposition conditions from a plurality of sets of decomposition conditions for the decomposition target so that the concentration of the decomposition target that is decomposed in the liquid within the decomposition chamber would be at a predetermined concentration level, an introducing step of continuously introducing the decomposition target into the decomposition chamber, a step of continuously decomposing the decomposition target in the liquid under the selected set of conditions, and a step of discharging decomposition products produced through the decomposition to outside the decomposition chamber, wherein, when the concentration of the decomposition target is at the predetermined concentration level in the decomposing step, the amount per unit time of the decomposition target that is taken into the liquid within the decomposition chamber is in equilibrium with the amount per unit time of the decomposition target that is decomposed within the decomposition chamber.

In accordance with another embodiment of the present invention, a decomposition apparatus may include a decomposition target supply device that supplies the decomposition target, a tank connected to the decomposition target supply device for decomposing the decomposition target, a decomposing device to decompose the decomposition target in the tank, and a drive device to drive the decomposing device, wherein the drive device drives the decomposing device in such a way that the amount of the decomposition target supplied by the decomposition target supply device is in equilibrium with the amount of the decomposition target that is decomposed in the tank.

The decomposition apparatus may additionally be equipped with a device to bring about a gas-liquid contact between a gas that contains the decomposition target and the liquid in which the decomposition target is to be decomposed, such that the drive device drives the decomposing device in such a way that the amount of the decomposition target supplied by the decomposition target supply device is in equilibrium with the amount of the decomposition target that is decomposed in the liquid within the tank.

The drive device may drive the decomposing device such that the amount of the decomposition target in the gas supplied by the decomposition target supply device and the amount of decomposition target that is decomposed in the liquid within the tank are in equilibrium at the predetermined concentration for the decomposition target in the liquid within the tank.

The liquid may contain the decomposition target before the decomposition target is supplied by the decomposition target supply device.

The drive device may begin to drive the decomposing device when the gas containing the decomposition target is supplied through the decomposition target supply device up to a point at which it yields a concentration of the decomposition target in the liquid that reaches a concentration equal to or greater than the predetermined concentration.

The drive device may begin to drive the decomposing device with the condition that the equilibrium be reached when the gas containing the decomposition target is supplied through the decomposition target supply device up to a point at which it yields a concentration of the decomposition target in the liquid that reaches a concentration equal to or greater than the predetermined concentration.

The liquid may be an electrolytic solution, and the decomposing device may be electrodes to perform electrolysis.

The decomposition apparatus may also include an absorption device to absorb decomposition target in a liquid, an electrolysis device to electrolyze the decomposition target in the liquid, and a setting device to set the input electrical charge for electrolysis by the electrolysis device so that the concentration of the decomposition target in the liquid would be about 0.5%–50%.

The decomposition target may be an organic chlorinated compound.

Chloride ions may be added to the liquid.

The liquid may be acidic.

The liquid's pH may be between 0.5 and 3.

Furthermore, the decomposition method according to the present invention comprises a step to supply a decomposition target to the decomposition apparatus and a step to decompose the decomposition target by driving the decomposing device within the decomposition apparatus, such that the decomposing device is driven in such a way that the amount of the decomposition target supplied to the decomposition apparatus is in equilibrium with the amount of decomposition target that is decomposed in the decomposition apparatus.

Other features and advantages of the invention will be apparent from the following detailed description, taken in conjunction with the accompanying drawings that illustrate, by way of example, various features of embodiments of the invention.

DETAILED DESCRIPTION OF PREFERRED EMBODIMENTS

Figure 1:
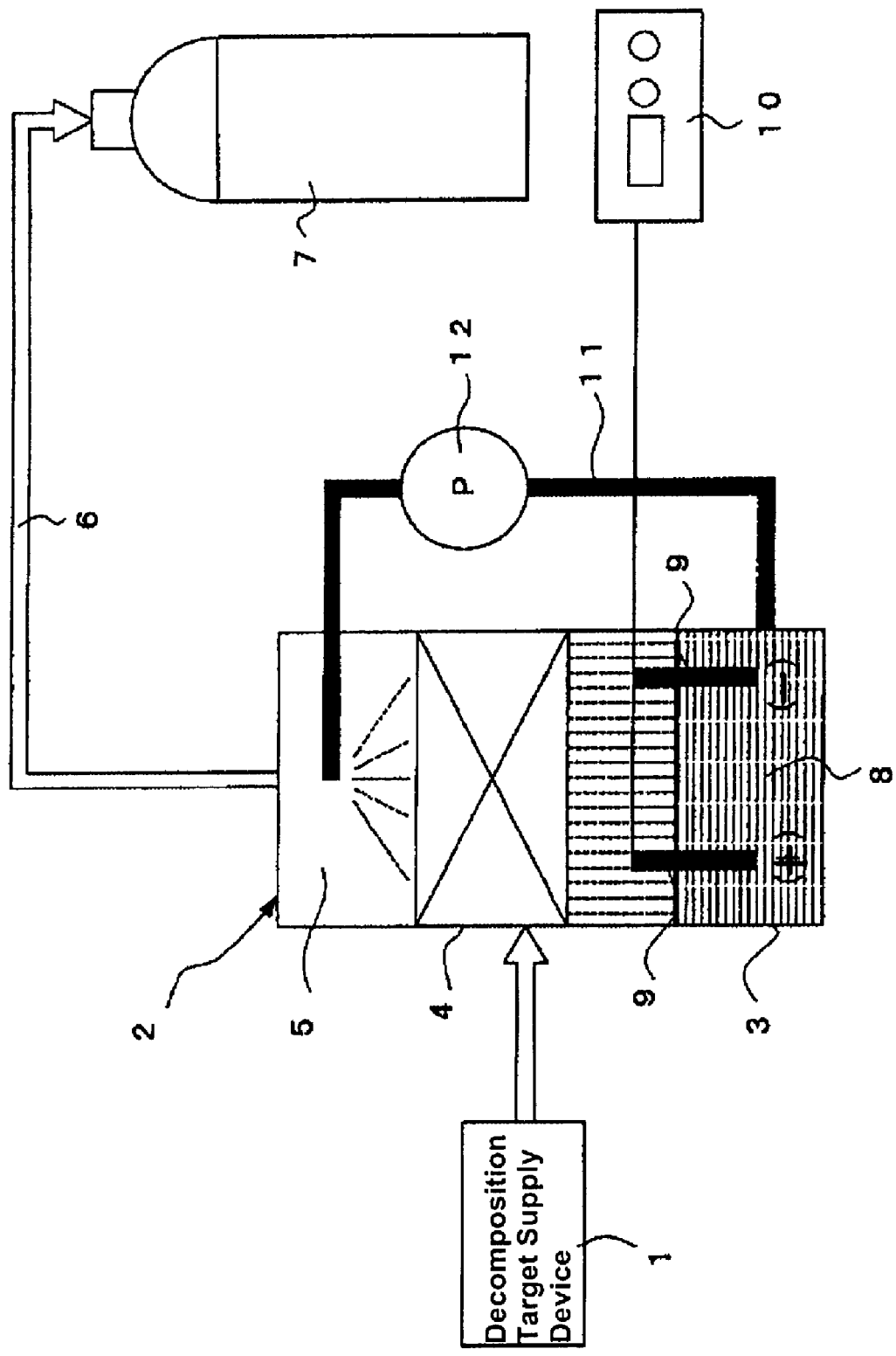
FIG. 1 is a diagram illustrating a decomposition/removal apparatus to which a decomposition method in accordance with a first embodiment is applied.

Next, preferred embodiments of the present invention will be described in detail with references to the accompanying drawings. FIG. 1 is a decomposition/removal device in accordance with a first embodiment of the present invention for decomposing and removing organic chlorinated compounds (substances) that are hazardous materials.

In FIG. 1, an organic chlorinated compound in a gaseous or mist state is introduced into a gas-liquid contact-type gas absorption tower 2, which is a decomposition chamber, by a decomposition target supply device 1 at a predetermined flow speed. The absorption tower 2 is a closed-type hollow shell structure, and has an absorber storage tank 3 that stores an absorber at the bottom; a built-in gas-liquid contact section 4 (an absorption device or an input device) in the center section comprising a packing material with high porosity and low resistance to gas flow; and above the gas-liquid contact section 4 a spray chamber 5 to spray the absorber. The top of the spray chamber 5 is connected to an absorption tower 7, which is a secondary processing unit, via an exhaust pipe 6.

The organic chlorinated compound in a gaseous or mist state may be, for example, dichloromethane; carbon tetrachloride; 1,2-dichloroethane; 1,1-dichloroethylene; cis-1,2-dichloroethylene; 1,1,1-trichloroethane; 1,1,2-trichloroethane; trichloroethylene; tetrachloroethylene; 1,3-dichloropropene; dioxin (tetrachlorodibenzo-?-dioxin) and other hazardous materials, and these are often found in contaminated soils in vacant lots where factories used to stand, for example.

Organic chlorinated compounds that are to be removed or decomposed include, in addition to the hazardous materials listed above, decomposition products of the above hazardous materials. For example, haloacetic acids such as trichloroacetic acid, dichloroacetic acid and monochloroacetic acid that are known to be produced when chloroethylene substances are photolyzed can be removed and/or decomposed using the present invention.

Dichloroacetic acid is produced when trichloroethylene-contaminated gas is photolyzed. Dichloroacetic acid is liquid at room temperature, but in systems in which photolysis takes place while the trichloroethylene-contaminated gas is continuously supplied, a decomposition product, dichloroacetic acid, is present in a mist state in the process gas flow.

The hazardous materials that are targets of decomposition and that are supplied from the decomposition target supply device include hazardous materials extracted from contaminated soil, contaminated groundwater, hazardous materials obtained by acrating contaminated water, hazardous materials adsorbed on activated carbon and released by heat, and hazardous materials in exhaust gas from factories and chemical processes.

An absorber 8 is stored in the storage tank 3. A pair of positive/negative electrodes 9, which is a part of the decomposition section is provided within the storage tank 3. Bottom portions of the electrodes 9 are immersed in the absorber 8, and the two electrodes are positioned opposite to each other. When a current that is DA converted by a rectifier 10 is applied to each of the electrodes 9, the absorber 8 is electrolyzed and chlorine gas and other byproduct gases isolated by this oxidation-reduction reaction move through the gas-liquid contact section 4, the spray chamber 5 and the exhaust pipe 6 to the absorption tower 7, where a secondary processing, such as absorption of chlorine gas, takes place continuously. The positive/negative electrodes 9 forms at least a part of an electrolysis device, while the rectifier 10 forms at least a part of a selection section that selects a set of drive conditions from a plurality of sets of conditions and a setting device that sets the selected set of conditions. By selecting a set of predetermined drive conditions, the concentration of the organic chlorinated compound in the absorption tower 2 can be held in equilibrium at the predetermined concentration.

An amperage required for electrolysis is adjusted by the rectifier 10 depending on the flow speed of a gas that contains the organic chlorinated compound and that is supplied from the decomposition target supply device 1 and on the concentration of the organic chlorinated compound. Possible means to measure the concentration of the organic chlorinated compound are estimating the concentration based on the concentration measured when a contaminant is absorbed from the soil, and providing a sensor within the absorption tower 2. More specifically, an input amperage for electrolysis is set so that the concentration of the organic chlorinated compound in the absorber 8 is between about 0.5% (more preferably 1%) and 50% (more preferably 10%).

The absorber 8 in the storage tank 3 is pumped up through a circulation pipe 11 (a manifold) by a circulation pump 12 that is positioned in the circulation pipe 11, and is sprayed by a delivery device onto the top of the gas-liquid contact section 4. As the absorber 8 flows downward inside the gas-liquid contact section 4, it captures the organic chlorinated compound from a gas that flows into the gas-liquid contact section 4 from the decomposition target supply device 1 (in the present embodiment, the organic chlorinated compound is input into the absorber 8) and flows down into the storage tank 3; and the cycle of its circulation into the gas-liquid contact section 4 via the circulation pipe 11 repeats.

It is desirable for the gas-liquid contact section 4 to maintain a long contact time between the gas and the liquid. To this end, a packing material with a labyrinth structure (trade name: Tri-Packs by Tomoe Kogyo Co., Ltd.), for example, can be used. While the organic chlorinated compound contained in the gas is introduced into a portion adjacent to the bottom of the gas-liquid contact section 4 and pushed upward to the exhaust pipe 6 by the gas that flows in from the decomposition target supply device 1, the absorber 8 that is sprayed onto the top of the gas-liquid contact section 4 drips on the gas containing the organic chlorinated compound and disperses it, thereby causing the absorber 8 and the gas containing the organic chlorinated compound to have a gas-liquid contact. Since the organic chlorinated compound in the gas introduced has properties that make it prone to being taken into a solution, it becomes dissolved in the absorber 8 as the absorber 8 that has absorbed the organic chlorinated compound flows downward into the storage tank 3. The reasons for having the organic chlorinated compound come into contact with the absorber 8 in the gas-liquid contact section 4 are that the gas that contains the organic chlorinated compound can be introduced with a small amount of energy and that the gas-liquid contact time can be maintained for a long time.

Water or an electrolytic aqueous solution such as sodium chloride dissolved in water is used as the absorber 8. However, if the organic chlorinated compound in question is a substance with low solubility, it is desirable to mix in advance a chemical agent that makes the organic chlorinated compound with low solubility easier to dissolve. That is, since substances with low solubility are nonpolar, chemical agents with affinity to such substances but in themselves are polar substances that easily dissolve in water are desirable. Ethanol is a specific example of such a chemical agent.

On the other hand, if the organic chlorinated compound is a substance that is difficult to electrolyze, the electrolysis efficiency can be improved by adding chloride ions to the absorber 8. Although the reason for this effect is not clear, it is surmised to be due to the production of hypochlorite ions, which have high oxidizability. This effect is explained in the next embodiment.

Gases that are generated as a result of decomposition through electrolysis are hydrogen, oxygen, chlorine, carbon dioxide and methane; since these gases are continuously discharged to the absorption tower 7 via the exhaust pipe 6, there is no accumulation of gases in the absorption tower 2. Gases produced are difficult to be taken into water, and they are therefore unlikely to be reabsorbed by the absorber 8 in the gas-liquid contact section 4. Further, the absorber 8 discharged from the absorption tower 2 travels through the circulation pipe 11 and is sprayed in the spray section 5 onto the top of the gas-liquid contact section 4, and this releases heat that has been generated. Moreover, due to the fact that the absorber 8 in the circulation pipe 11 is forcefully circulated by the circulation pump 12, there is no accumulation of gases within the circulation pipe 11 either.

According to the present embodiment, since all of the solution that absorbs the organic chlorinated compound during or after electrolysis is circulated and not discharged outside of the system that includes the gas-liquid contact-type gas absorption tower 2, there is practically no need to process the solution.

Furthermore, the absorber 8 is circulated by the circulation pump 12 through the storage tank 3, where the electrolysis of the gas containing the organic chlorinated compound that is introduced into the gas-liquid contact-type gas absorption tower 2 from the decomposition target supply device 1 at a predetermined flow speed takes place. Consequently, the absorption and electrolysis of the organic chlorinated compound take place continuously and simultaneously. Accordingly, for example, by measuring by sensors the concentration of the organic chlorinated compound in the gas introduced into the gas absorption tower 2 and the flow volume of the gas containing the organic chlorinated compound for given input amperage, an experiment data table may be created based on the measured values. By using the data table, the input amperage can be set in a manner that the concentration of the organic chlorinated compound within the absorber 8 is between about 0.5% (more preferably 1%) and about 50% (more preferably 10%), as stated above. As a result, the concentration of the organic chlorinated compound within the absorber 8 can be maintained at a high level, i.e., a high concentration can be maintained. As a result of this, the electrolysis efficiency per unit amperage supplied from the rectifier 10, which has both the setting device to select and set the predetermined current value and the drive device, can be maintained at a high level at all times. The relationship among the concentration of the organic chlorinated compound, the gas flow volume and the input amperage can be set to the predetermined setting values that may be selected by the rectifier 10 using a table created based on experiment results, for example.

The concentration of the decomposition target in the liquid within the decomposition chamber increases gradually to a concentration at which the amount per unit time of the organic chlorinated compound introduced into the liquid and the amount per unit time of the organic chlorinated compound that is decomposed in the decomposition chamber reach equilibrium with each other (hereinafter called "the predetermined concentration"), and once the predetermined concentration is reached, the two amounts maintain equilibrium and indicate constant values.

"Equilibrium" in this case refers to a state in which the amount of the organic chlorinated compound that is taken into the liquid and the amount of the organic chlorinated compound that is decomposed are in balance with each other when the concentration of the organic chlorinated compound being decomposed under a selected set of drive conditions is at the predetermined concentration, but it also includes fluctuations resulting from slight variances in the amount of the organic chlorinated compound being introduced. In other words, continuous decomposition at the equilibrium concentration indicates decomposition at a capacity suitable for decomposing the decomposition target (a predetermined decomposition capacity).

Figure 5:
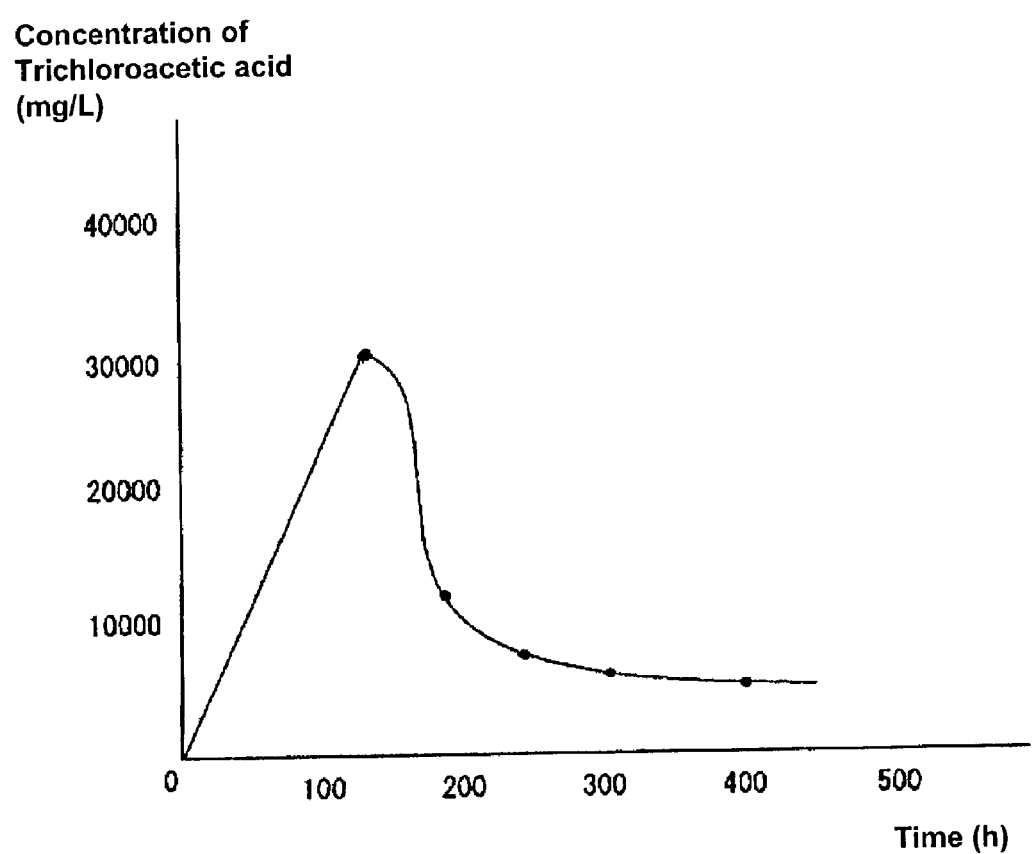
FIG. 5 is a graph showing the results of the second embodiment.

As shown a FIG. 5, where the y-axis indicates the concentration of a decomposition target in a liquid and the x-axis indicates time, the concentration of the decomposition target in the liquid within the decomposition chamber may be gradually increased to a concentration level higher than the predetermined concentration level, and the decomposition may be subsequently performed continuously under the predetermined decomposition capacity. When the concentration of the decomposition target in the liquid is increased to a concentration level higher than the predetermined concentration level, the decomposition efficiency rises under a constant current and allows decomposition to take place in a shorter time than when the concentration is raised only to the predetermined concentration.

The operational conditions for the liquid described above can be restated as follows:

Here, let us assume that the amount of decomposition target that transfers into the liquid within the per unit time is a, and the amount of decomposition target that is decomposed in the liquid within the per unit time is d. Since the amount d of decomposition target that is decomposed in the liquid within the per unit time is a function of the concentration D of the decomposition target in the liquid, the higher the concentration D of the decomposition target in the liquid, the more the amount d of decomposition target that is decomposed increases. In other words, when $d=f(D), f'(D)>0$, a decomposition process at the concentration D of the decomposition target in the liquid takes place, such that the following relation is established:

$a=d$

The decomposition operation may be performed when the input amperage is set at a value that would allow D to be between about 0.5% (more preferably 1%) and about 50% (more preferably 10%).

In the above example, the concentration of the decomposition target was gradually increased mainly in a processing section of the decomposition chamber, but the processing section can be filled in advance with a liquid containing the decomposition target at the predetermined concentration. More specifically, the concentration of the decomposition target in the liquid that fills the decomposition chamber may be set in advance to a concentration equal to or greater than a concentration in a region of equilibrium (the predetermined concentration) before the electrolysis takes place.

Figure 2:
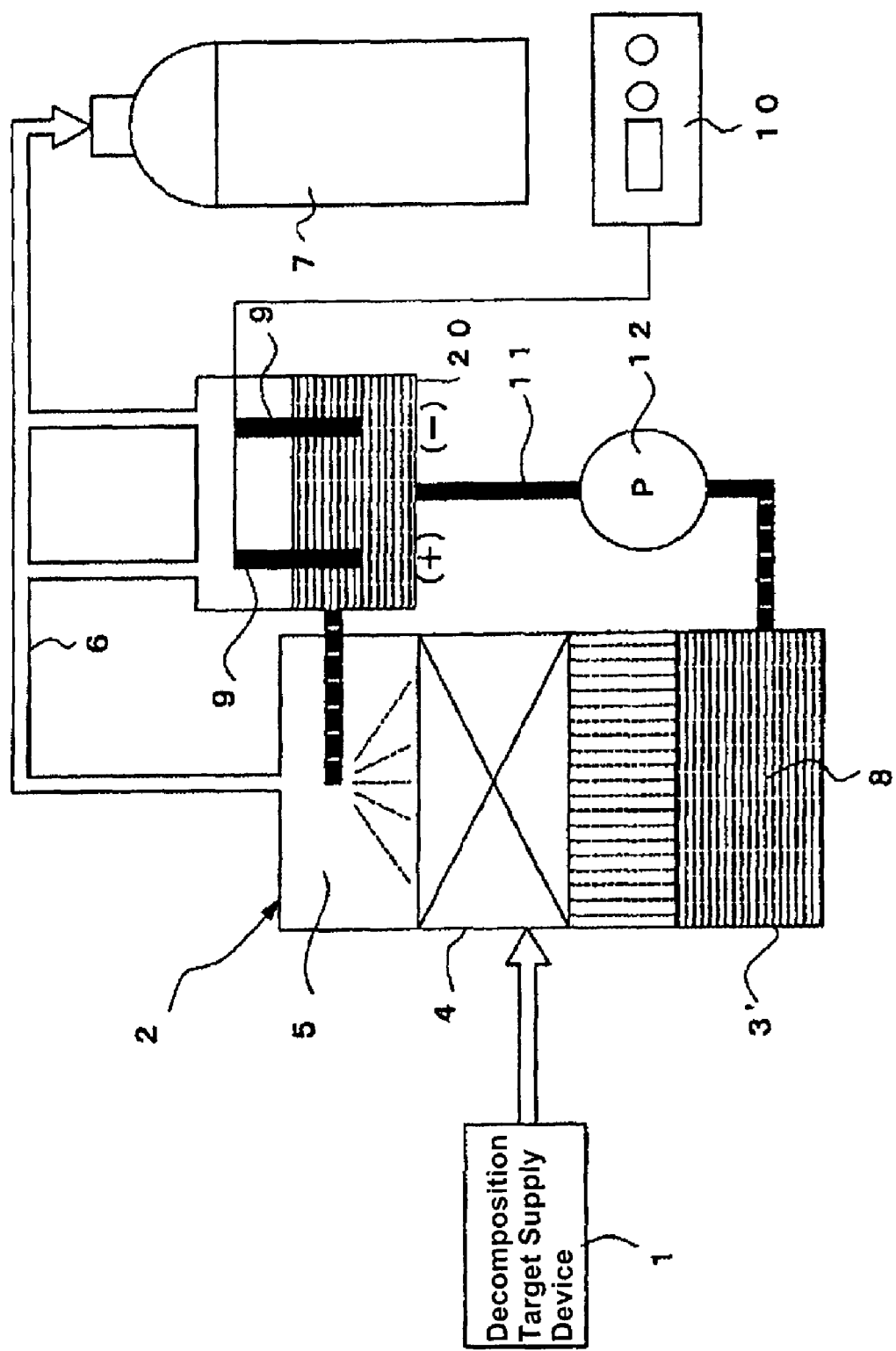
FIG. 2 is a decomposition/removal apparatus in accordance with a second embodiment of the present invention.

FIG. 2 is a decomposition/removal device in accordance with a second embodiment of the present invention; it differs from the first embodiment in that positive/negative electrodes 9 are not provided in a storage tank 3' of a gas-liquid contact-type gas absorption tower 2, that an electrolysis tank 20 is provided along the path of a circulation pipe 11, and that a pair of positive/negative electrodes 9 is provided inside the electrolysis tank 20; otherwise, the structure of the second embodiment is the same as that of the first embodiment and effects similar to those of the first embodiment can be obtained from the second embodiment as well.

Many modifications can be made without departing from the present invention. For example, in the second embodiment, electrodes provided in the storage tank 3 as in the first embodiment may be added. In addition or instead thereof, a pair of positive/negative electrodes 9 can be provided in the gas-liquid contact section 4. Further, together with the electrolysis tank 20 provided in the second embodiment, or instead of it, a pair of positive/negative electrodes 9 can be provided in the circulation pipe. In either the first or second embodiment, one of the positive/negative electrodes 9 can be connected to the shell of the gas-liquid contact-type gas absorption tower 2 or the circulation pipe 11. Or, the structures of the first and second embodiments can be combined, or a structure may combine various modifications described in this paragraph.

In the embodiments described above, the gas-liquid contact-type gas absorption tower 2 was used, but the gas-liquid contact section 4 may be omitted, or together with it, an introduction pipe for carrying gas containing organic chlorinated compound can be directly inserted into the absorber 8 stored in the storage tank 3, so that the organic chlorinated compound can be directly absorbed by the absorber 8.

Organic chlorinated compounds are listed as hazardous materials in the present specification, but substances that can be decomposed under this invention are not limited to these and include all substances involved in oxidation-reduction reaction in addition to those listed.

EXAMPLES

Example 1

When the organic chlorinated compound in a gaseous or mist state that is the subject of measurement is DCA, the following concentration projection was made concerning the relationship among the measurement conditions, absorption rate of the organic chlorinated compound and the amount of decomposition, based on the following theoretical formulas.

<1. Conditions>

DCA production rate D: μg/sec (constant)

Energization time T: sec

DCA absorber amount V: L

Initial DCA concentration C(0): μg/L

Concentration C(T) of DCA in solution after T sec: μg/L

DCA decomposition amount R per unit electrical charge: μg/c

<2. Without Energization>

When DCA is absorbed without any energization, the concentration of the DCA in the solution after T sec is expressed by the following formula:

$$C(T)=(DT/V)+C(0) \quad (1)$$

<3. With Energization>

The following relational formula for the decomposition amount R μg/c per unit electrical charge was established from an experiment (3.5 L desiccator, Cl concentration 0.1%):

$$R=0.032\times\{C(T)\times10^{-3}\}0.88 \quad (2),$$

the approximation of which is:

$$R=6.14\times10^{-3}(C(T)\times10^{-3}) \quad (3)$$

Since R×dE=R×I (constant current)×dT, the decomposition amount in dT sec is expressed by the following formula:

$$\text{Decomposition amount}=6.14\times10^{-6}\times C(T)\times I\times dT \quad (4)$$

Since the DCA production amount in dT sec is D×dT, the concentration change dC in dT can be expressed by the following formula:

$$dC=(DdT/V)-(6.14\times10^{-6}\times C(T)\times dT)/V$$

$$dC/dT=D/V-(6.14\times10^{-6}\times C(T)\times I)/V \quad (5)$$

Here, when $D/V=a$ and $(6.14\times10^{-6}\times I)/V=b$, $$dC/dT=a-bC(T)=b((a/b)-C(T))=-b(C(T)-(a/b))$$

$$d(C(T)-(a/b))/dT=dC(T)/dT-(d(a/b))/dT=-b(C(T)-(a/b))$$

$$d(C(T)-(a/b))/((C(T)-(a/b))=-bdT$$

When both sides are integrated with T:

$$\log(C(T)-(a/b))=-bT+K; \text{ where } K \text{ is a constant.}$$

$$C(T)-(a/b)=e-bT+K=K1e-bT; \text{ where } K1 \text{ is a constant.}$$

Therefore:

$$C(T)=(a/b)+K1e-bT$$

Here, since the initial concentration (T=0) is C(0), $$K1=C(0)-(a/b)$$

$$C(T)=(a/b)+(C(0)-(a/b))e-bT \quad (6)$$

When $T\to\infty$, $C(\infty)=(a/b)=D/(6.14\times10^{-6}\times I)$.

Next, an electrolysis experiment was conducted based on the above theory and the following results were obtained:

1. Experiment Conditions

Decomposition target: DCA in a gaseous or mist state in air

Absorption rate: approximately 15 μg/sec (with some fluctuations)

Absorber amount: 3 L

Concentration of chloride ions in absorber: 0.1%

Initial concentration: initial DCA concentration in absorber (concentration approximately 1000 mg/L before energization)

Energization conditions: direct current 2 A, voltage 20V

Electrode shape: platinum electrodes, plate-shaped (50 cm$^2$), distance between electrodes 3 cm Device structure: a structure with electrodes inserted into an absorption tower (see FIG. 1)

2. Experiment Results

Figure 3:
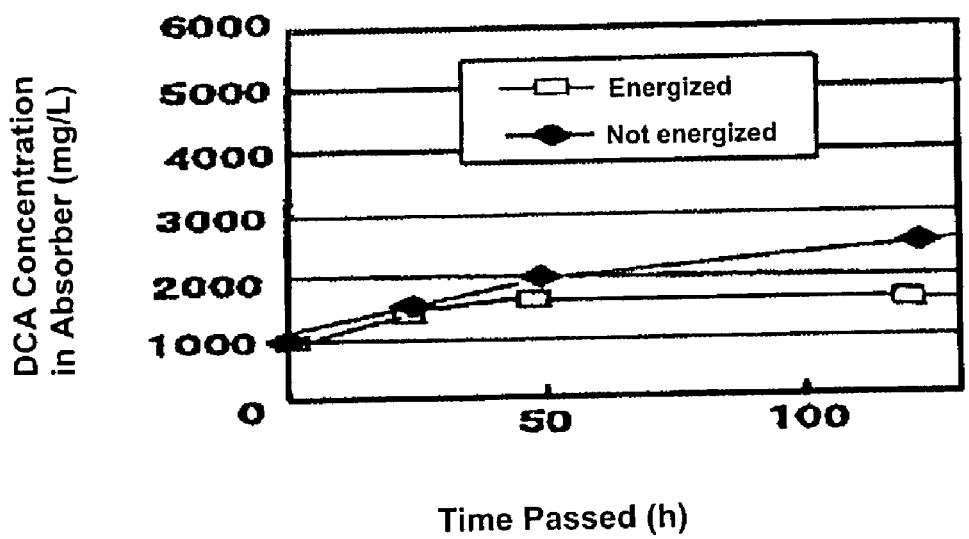
FIG. 3 is a graph comparing two situations, one with absorption only and the other with absorption and electrolysis combined.

The results are shown in FIG. 3. From this graph, it can be observed that although the concentration of DCA in the absorber increases and accumulates when there is no energization, once the current is applied across the electrodes 9, the concentration of DCA remains constant after 50 hours of energization. No DCA was found in the exhaust gas from the equivalent of the exhaust pipe 6 in FIG. 1.

Next, an experiment was conducted on the decomposition efficiency when the amount of chloride ions, which serve as electrolytes in the absorber, was varied and the following results were obtained:

1. Experiment Conditions

Decomposition target: DCA in aqueous solution 100 mg/L

Absorber amount: 3 L

Energization conditions: direct current 2 A, voltage 30V

Figure 4:
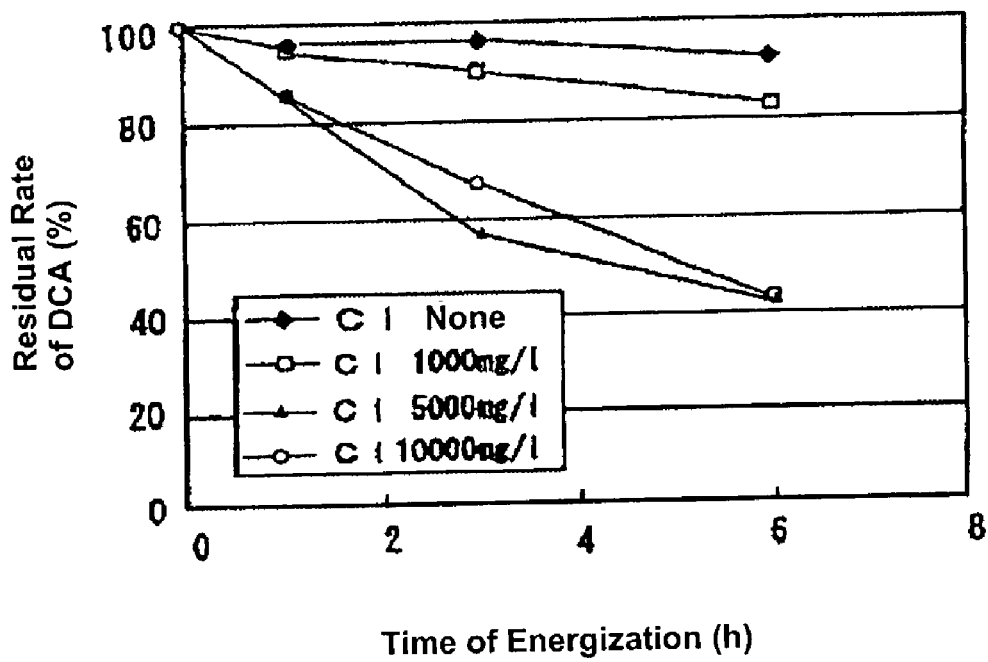
FIG. 4 is a graph showing the relationship between the amount of chlorine added and the amount of dichloroacetic acid (DCA) reduced during electrolysis.

Electrode shape: platinum electrodes, plate-shaped (50 cm$^2$), distance between electrodes 3 cm 2. Experiment Results The results are shown in FIG. 4. From this graph, it is confirmed that the higher the concentration of chloride ions in the solution, the more the residual rate of the DCA decreases, which shows that the higher the concentration of chloride ions, the higher the decomposition efficiency becomes.

Example 2

Another embodiment will be described with reference to FIG. 2.

Trichloroacetic acid in a mist state is supplied from the decomposition target supply device 1 to the gas-liquid contact-type gas absorption tower 2. The trichloroacetic acid in mist state has been produced by decomposing tetrachloroethylene in a previous step (omitted from drawings), which was a photolysis reaction.

The circulation pump 12 is driven to circulate the absorber and the trichloroacetic acid is transferred into (absorbed by or input into) the absorber. At this time, since no current is applied across the electrodes 9 in the electrolysis tank 20, no electrolysis takes place.

As a result of this, the concentration of the trichloroacetic acid in the absorber continues to rise. That is, the concentration of the substance to be decomposed within the absorber is allowed to gradually increase from the beginning of its input. The reason for not performing any decomposition at this stage is that the concentration of the trichloroacetic acid in the absorber is low in the initial stages of the operation, which does not produce efficient electrolysis. Even when the amperage is constant, the higher the concentration of trichloroacetic acid in the absorber, the higher the amount of decomposition through electrolysis becomes, as can be seen in the first embodiment. For this reason, the decomposition efficiency improves with higher concentration.

Consequently, the concentration of the trichloroacetic acid in the absorber rises and the electrolysis device is driven once the concentration reaches a predetermined concentration. This allows for an optimum operation, in which no electrolysis takes place during the period when the efficiency of electrolysis is poor and electrolysis takes place when the concentration has reached a point that would yield good efficiency. By operating in this way, even when the electrical charge is constant, the amount of decomposition through electrolysis increases as the concentration rises, so that ultimately equilibrium can be reached and maintained in a region where the amount of the trichloroacetic acid that enters the gas-liquid contact-type gas absorption tower 2 and the amount of decomposition through electrolysis become equal with each other, and the decomposition can continue in that state.

The electrolysis device can be driven by a driving device once the concentration reaches the predetermined concentration, but a weak current can be applied to protect the electrodes until the predetermined concentration is reached, at which point a current required for decomposition can be applied.

Another way to gradually increase the concentration of the substance to be decomposed within the absorber is to input as an absorber a solution already having the predetermined concentration.

The concentration at which the amount of decomposition target entering and the amount of decomposition through electrolysis are equal, and at which equilibrium can be maintained, can be set by the current used in electrolysis. At low amperage, equilibrium is reached at a high concentration; and at high amperage, it is reached at a low concentration.

In an example using a system such as the one shown in FIG. 2, trichloroacetic acid, which is the decomposition target, entered the gas-liquid contact-type gas absorption tower 2 at an average rate of 300 mg/min. The volume of the absorber 8 was approximately 70 L, and the concentration of the trichloroacetic acid over five days reached higher than 30,000 mg/L. Energization was started then and electrolysis was performed under the conditions of 15 A and 2.8V; although the trichloroacetic acid was supplied continuously, the concentration of the trichloroacetic acid in the absorber changed to 10,000 mg/L after 50 hours and generally reached equilibrium at 5000 mg/L after 120 hours.

During this time, the trichloroacetic acid was not found in the exhaust gas from the exhaust pipe 6.

Example 3

Using a solution containing chlorine ions when the organic chlorinated compound that is the decomposition target is trichloroacetic acid, the amount of decomposition of the trichloroacetic acid was investigated through an experiment varying the pH.

1. Experiment Conditions

Decomposition target: trichloroacetic acid (TCA) in aqueous solution 7{KK}mg/l.

Solution: run 1—a comparative experiment example in which the pH of the solution is near neutral (pH 6.11)
 run 2—an experiment example in which the pH of the solution is 3 or lower (pH 0.97)
Absorber amount: 3 L
Concentration of chlorine ions in absorber: 0.1%
Energization conditions: direct current 2 A, voltage 30V
Electrode shape: platinum electrodes, plate-shaped (50 $cm^2$), distance between electrodes 3 cm
Source of acid supply: 6N hydrochloric acid 100 mL 2. Experiment Results The results are shown in Table 1 below.

TABLE 1

| Item | Unit | run 1 Initial | run 1 After 6 hrs. | run 2 Initial | run 2 After 6 hrs. |
|---|---|---|---|---|---|
| pH | | 6.11 | 8.98 | 0.97 | 1.25 |
| TCA Concentration | mg/L | 1250 | 1150 | 1080 | 590 |
| TCA Residual Rate | % | 100 | 92.0 | 100 | 54.6 |

Compared to run 1 in which the pH of the solution is near neutral, it can be observed that decomposition in run 2 in which the pH of the solution is adjusted at a lower level progressed more efficiently. The reason for this is not clear, but the following can be surmised. When electrolyzed, chlorine ions produce chlorine $Cl_2$ at the positive pole. Further, the solution becomes alkaline through continuous electrolysis. The chlorine $Cl_2$ produced is in equilibrium with hypochlorite ions and chlorine ions in water, but in an alkaline solution the reaction tends to produce hypochlorite ions and chlorine ions, which causes the chlorine $Cl_2$ to turn back into chlorine ions. In this way, under alkaline condition the energy of electrolysis is consumed by the cycle reaction involving the chlorine $Cl_2$ and chlorine ions; consequently, by adding an acid such as hydrochloric acid to make the solution acidic, the electrical energy consumed by this cycle reaction can be reduced. As a result, it is surmised that an increase in the electrical energy available for the decomposition of TCA led to improved TCA decomposition efficiency.

Any method can be used to reduce the pH or to maintain a low pH, but one way is to create a condition that makes it difficult for the solution to turn alkaline through electrolysis by adding an acid such as hydrochloric acid or sulfuric acid, by restricting the amount of electrolytes added that is required for electrolysis, or by selective use of the type of electrolytes. If the decomposition products from electrolysis are acidic, they can also be utilized.

The pH should be 5 or lower, but more preferably 0.5–3. Lowering the pH is especially effective in systems in which chlorine is continuously supplied to an electrolyzing system, i.e., when the decomposition target and chlorine ions coexist and are supplied continuously, or when chlorine is produced from the decomposition target.

As the above description makes clear, a solution that has taken in an organic chlorinated compound, which is the decomposition target, can be continuously processed while maintaining high decomposition efficiency, according to the decomposition apparatuses and the decomposition method for decomposition target in the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A decomposition apparatus that decomposes a decomposition target, the decomposition apparatus comprising:
a decomposition chamber having a decomposition section that continuously decomposes the decomposition target;
an introducing device that continuously introduces a gas containing the decomposition target into the decomposition chamber;
a device that brings the gas containing the decomposition target that is introduced into the decomposition chamber into contact with a liquid that is input into the decomposition chamber, whereby the gas is taken into the liquid;
a discharging device that discharges decomposition products produced in the decomposition chamber;
a circulation pump that circulates the liquid in the decomposition chamber such that the gas containing the decomposition target to be introduced is taken into the liquid; and
a selection section that selects a set of drive conditions from a plurality of sets of conditions for the decomposition section such that the concentration of the decomposition target within the decomposition chamber during decomposition of the decomposition target is at the predetermined concentration,
wherein, when the concentration of the decomposition target is the predetermined concentration during decomposition in the decomposition section under the set of drive conditions selected by the selection section, the amount per unit time of the decomposition target that is taken into a liquid within the decomposition chamber is in equilibrium with the amount per unit time of the decomposition target that is decomposed within the decomposition chamber.

2. A decomposition apparatus according to claim 1, wherein the decomposition section is equipped with electrodes to perform electrolysis.

3. A decomposition apparatus according to claim 1, wherein the drive condition is a current value to perform the electrolysis.

4. A decomposition method for decomposing a decomposition target in a liquid within a decomposition chamber, the decomposition method comprising:
a selection step of selecting a set of decomposition conditions from a plurality of sets of decomposition conditions for the decomposition target so that the concentration of the decomposition target that is decomposed in the liquid within the decomposition chamber is at a predetermined concentration;
an introducing step of continuously introducing a gas containing the decomposition target into the decomposition chamber;
a step of bringing the gas containing the decomposition target into contact with the liquid, whereby the gas is taken into the liquid;
a step of continuously decomposing the decomposition target in the liquid under the selected set of conditions;
a step of circulating the liquid in the decomposition chamber so that the gas containing the decomposition target to be introduced is taken into the liquid; and
a step of discharging decomposition products produced through the decomposition to outside the decomposition chamber,
wherein, when the concentration of the decomposition target is at the predetermined concentration in the decomposing step, the amount per unit time of the decomposition target that is taken into the liquid within the decomposition chamber is in equilibrium with the amount per unit time of the decomposition target that is decomposed within the decomposition chamber.

5. A decomposition method according to claim 4, wherein the decomposition of the decomposition target begins after the concentration of the decomposition target within the decomposition chamber has increased to the predetermined concentration.

6. A decomposition method according to claim 4, wherein the decomposition of the decomposition target begins after the concentration of the decomposition target has increased to a concentration higher than the predetermined concentration.

7. A decomposition method according to claim 4, wherein the liquid is an electrolytic solution.

8. A decomposition method according to claim 7, wherein the electrolytic solution contains an additive with affinity to nonpolar substances.

9. A decomposition method according to claim 4, wherein the concentration of the decomposition target is about 0.5–about 50%.

10. A decomposition method according to claim 4, wherein the decomposition target is an organic chlorinated compound.

11. A decomposition method according to claim 10, wherein the organic chlorinated compound is at least one of monochloroacetic acid, dichloroacetic acid and trichloroacetic acid.

12. A decomposition method according to claim 4, wherein the liquid contains chloride ions.

13. A decomposition method according to claim 4, wherein the liquid is a sodium chloride solution.

14. A decomposition method according to claim 4, wherein the liquid is acidic.

15. A decomposition method according to claim 14, wherein the liquid's pH is between 0.5 and 3.

* * * * *

UNITED STATES PATENT AND TRADEMARK OFFICE
CERTIFICATE OF CORRECTION

PATENT NO. : 7,169,287 B2
APPLICATION NO. : 10/206697
DATED : January 30, 2007
INVENTOR(S) : Toshihiko Miura et al.

It is certified that error appears in the above-identified patent and that said Letters Patent is hereby corrected as shown below:

COLUMN 11

Line 67, "7{KK} mg/l." should read --1000 mg/l.--.

Signed and Sealed this

Third Day of July, 2007

JON W. DUDAS
*Director of the United States Patent and Trademark Office*